United States Patent [19]

Watson et al.

[11] 4,022,630

[45] May 10, 1977

[54] PORTLAND CEMENT-MAKING AND MUNICIPAL REFUSE CONVERSION

[75] Inventors: David Watson, Longfield; Peter Hood, Nottingham, both of England

[73] Assignee: The Associated Portland Cement Manufacturers Limited, London, England

[22] Filed: Feb. 9, 1976

[21] Appl. No.: 656,574

Related U.S. Application Data

[63] Continuation of Ser. No. 382,167, July 24, 1973, abandoned.

[30] Foreign Application Priority Data

July 27, 1972 United Kingdom ............ 35283/72

[52] U.S. Cl. .............................................. 106/103
[51] Int. Cl.² ......................................... C04B 7/02
[58] Field of Search ........... 106/100, 101, 102, 103

[56] References Cited

UNITED STATES PATENTS 3,442,498   5/1969   Davis .................................. 106/103

Primary Examiner—J. Poer
Attorney, Agent, or Firm—Diller, Brown, Ramik & Wight

[57] ABSTRACT

The invention provides a method of incinerating municipal refuse by burning it in a pulverized condition in a rotary kiln with added basic mineral matter, especially Portland cement raw materials, at a temperature sufficient to burn off all combustibles. A stony aggregate is obtained, which in a preferred embodiment is clinker, the rotary kiln being part of a cement plant. Conventional fuel may also be used for firing along with the refuse.

3 Claims, No Drawings

PORTLAND CEMENT-MAKING AND MUNICIPAL REFUSE CONVERSION

This is a continuation of application Ser. No. 382,167, filed July 24, 1973, now abondoned in favor of this application.

The present invention relates to the disposal of refuse by incineration, and more particularly to the disposal of municipal refuse by burning under conditions such as to yield substantially only useful or harmless products.

By "municipal refuse" we refer to refuse of the type normally collected for disposal by local government authority or agency and primarily of household origin.

Municipal refuse is normally disposed of in four ways:
1. tipping of untreated refuse;
2. tipping of pulverised and compacted refuse;
3. incineration in specially designed plants;
4. composting.

In the first case the principal problem is the scarcity of suitable sites associated with amenity problems and the need for sterilisation of the completed tip for building purposes for about 25 years.

In the second case a more compact material can be tipped but it is necessary to install and operate costly pulverising plant.

In the third case, although steam can be produced in the process and used for heating or electricity generation, a relatively high capital outlay is involved and the ash, representing about 18 per cent of the original weight, has still to be disposed of.

In the fourth case, by no means all the refuse is amenable to composting, not being biodegradable, and the method also calls for substantial space.

It is an object of the present invention to provide a method of utilising municipal refuse in a way which permits total disposal of the refuse with none of the foregoing disadvantages and without giving rise to unacceptable by-products.

It is another object of the invention to utilise municipal refuse in a process of making cementitious material, particularly Portland cement.

We have found that the foregoing and other objects are fulfilled if the refuse is burned in the presence of a basic material under suitable conditions.

According to the present invention a method of utilising municipal refuse comprises burning said refuse in a pulverised condition in a rotary kiln with basic mineral matter at a temperature sufficient to burn off all combustibles, and recovering a stony agglomerate therefrom.

In the preferred embodiments of the invention the basic mineral matter is calcareous. The rotary kiln may for instance be fed with a chalk slurry and fired by the municipal refuse to yield hardcore as the stony agglomerate.

In a highly advantageous embodiment of the invention the basic mineral matter takes the form of the raw materials for Portland cement manufacture, whereupon the stony agglomerate formed is cement clinker, the rotary kiln being suitably part of conventional apparatus for the manufacture of Portland cement.

A fuel other than the pulverised municipal refuse, i.e., conventional fuel for firing a cement kiln whether coal, oil or gas, may be used for firing the kiln along with the refuse, the fuel and refuse being supplied in any relative proportions that may be desired, and depending principally only upon the availability of refuse in relation to desired cement output. It will thus be appreciated that in one aspect the invention offers a cement making process in which a saving may be made in conventional fuel.

When pulverised refuse and conventional fuel are both supplied to fire the kiln, the refuse may be fed in directly and separately from the fuel, or jointly with the fuel, or even with the cement raw materials such as the slurry fed to the rotary kiln in the wet process for cement making. In any event it is preferable to arrange for the refuse feed rate to be separately controlled from the feed rates of the other materials.

In a typical method of performing the invention the refuse material is delivered to a cement works to a reception point where the material can be weighed before being passed to a hopper; following which it is prepared for the kiln by conventional refuse treatment methods involving, for instance, preliminary separation of paper and metal and then pulverisation. Further metal separation in the form of ballistic and/or magnetic separation can also be carried out. It will be appreciated that it is only necessary in the preparation stage to eliminate troublesome material from the point of view of the kiln burning process, to recover valuable waste material if desired and reduce the refuse to a condition in which it can be fed into the kiln for instance by blowing it in, with or without conventional kiln fuel.

The material may be blown directly into the kiln from the pulveriser or fed via a conventional coal mill. Final drying of the material is achieved at this stage and all surviving heavy objects such as metal fragments are eliminated.

It is difficult to qualify the fragment size of material entering the kiln since, while dense particles such as cinder are crushed to a fine powder, fragments of greater mass but of a pliable nature such as pieces of paper or plastics film tend to pass through the system. There is, however, no problem in igniting such light material; it is sufficient that the particles and fragments should be air-borne on entry into the kiln.

When firing the kiln with both refuse and conventional fuel, for instance in proportions between 90 per cent/10per cent conventional fuel/refuse and 40 per cent/60 per cent conventional fuel/refuse, a constant ratio is not possible because of the variability of refuse calorific value. Operating with a high refuse content will in general give rise to a high ash content, but within the range typified above the ash is absorbed into cement clinker and allowance can be made for it so as to avoid any detriment to final cement quality.

The calorific value of refuse is subject to wide variation between limits of about 200 and 400 cal/g depending on the origin of the material and the time of year. For example, househould refuse from a smoke-controlled area will have a higher calorific value than that from an area with fewer smoke control zones, because of a higher cinder proportion. In summer there is a higher content of paper and vegetable matter producing a higher calorific value than is winter when there is a greater proportion of spent ash.

The average calorific value of dry refuse is of the order of 300 cal/g while that of coal is of the order of 7000 cal/g. Therefore when using fuel and refuse together a refuse content of 40 per cent represents a coal saving of about 17 per cent. In a test on a kiln normally consuming 1610 Kcal/kg clinker, the consumption using 60 per cent coal and 40 per cent refuse was 1190 Kcal/kg clinker. This represents a theoretical heat saving of 420 Kcal/kg clinker.

The basic mineral matter, e.g. Portland cement-making material, is fed into the kiln in the normal conventional manner for a cement clinker kiln.

Burning refuse at temperatures contemplated herein, i.e. typical cement manufacturing temperatures of about 1350° C in a rotary kiln and a flame temperature of about 1800° C, has the considerable advantages over normal municipal incinerators of providing (1) a temperature at which there is virtually complete destruction of the refuse material, leaving no unwanted residue to be transported away, (2) adequate scrubbing of the gases released from the refuse by the basic matter, thus reducing corrosion problems and acidic gas emissions to the atmosphere and (3) elimination of the possibility of emitting offensive odours from the stacks.

Process control can be achieved by measuring the temperature in the burning zone and linking it automatically with conventional fuel feed equipment to vary the feed of conventional fuel while maintaining a steady feed of refuse.

What is claimed is:

1. The method of making Portland cement clinker of selected final quality while also disposing of municipal refuse, which comprises the steps of:

a. providing comminuted municipal refuse to obtain particulate municipal refuse capable of being blown into a kiln in air-borne fashion and which will produce an ash when burned at a temperature in the order of 1800° C;
    b. preparing a Portland cement raw feed mix capable of accommodating said ash during clinkering into Portland cement to avoid any detriment to said final cement quality;
    c. introducing said raw feed mix into a conventional rotary cement kiln;
    d. firing said conventional kiln by blowing in conventional rotary cement kiln fuel and said particulate municipal refuse of step (c) into the kiln along with combustion air;
    e. controlling the relative proportions of the conventional fuel and the particulate municipal refuse of step (d) to obtain Portland cement clinker without any detriment to final cement quality as defined in step (b); and
    f. recovering Portland cement clinker of said selected final quality from said kiln.

2. The method of claim 1 in which the refuse fuel feed rate is regulated separately from the conventional fuel feed rate.

3. The method of claim 2 in which said refuse fuel comprises up to 60% by weight of the conventional fuel supplied to the process.

* * * * *

UNITED STATES PATENT OFFICE
CERTIFICATE OF CORRECTION

PATENT NO. : 4,022,630
DATED : May 10, 1977
INVENTOR(S) : David Watson and Peter Hood It is certified that error appears in the above-identified patent and that said Letters Patent are hereby corrected as shown below:

Column 2, line 54, "200 and 400 cal/g" should read ---2000 and 4000 cal/g---;

line 64, "300 cal/g" should read ---3000 cal/g--- .

Column 4, line 14, "step (c)" should read -- step (a) --.

Signed and Sealed this

Twenty-fifth Day of October 1977

[SEAL]

Attest:

RUTH C. MASON
Attesting Officer

LUTRELLE F. PARKER
Acting Commissioner of Patents and Trademarks